United States Patent
Ballard et al.

(10) Patent No.: US 12,503,561 B2
(45) Date of Patent: *Dec. 23, 2025

(54) MICROPARTICLES FROM THERMOMECHANICALLY DEGRADED PTFE

(71) Applicant: ZEUS COMPANY INC., Orangeburg, SC (US)

(72) Inventors: Robert L. Ballard, Lexington, SC (US); Patrick Cooper, Orangeburg, SC (US); Douglas Lee Tourville, Orangeburg, SC (US)

(73) Assignee: ZEUS COMPANY LLC, Orangeburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/586,800

(22) Filed: Feb. 26, 2024

(65) Prior Publication Data

US 2024/0191041 A1   Jun. 13, 2024

Related U.S. Application Data

(63) Continuation of application No. 17/329,346, filed on May 25, 2021, now Pat. No. 11,939,435.

(60) Provisional application No. 63/030,634, filed on May 27, 2020, provisional application No. 63/029,851, filed on May 26, 2020.

(51) Int. Cl.
| | | |
|---|---|---|
| *C08G 63/02* | (2006.01) | |
| *C08J 3/12* | (2006.01) | |
| *C08J 11/06* | (2006.01) | |
| *C08L 27/18* | (2006.01) | |

(52) U.S. Cl.
CPC ............... *C08J 3/12* (2013.01); *C08J 11/06* (2013.01); *C08L 27/18* (2013.01)

(58) Field of Classification Search
USPC ........................ 528/190, 193, 194; 521/46
See application file for complete search history.

(56) References Cited

FOREIGN PATENT DOCUMENTS

| JP | 62121093 A | * | 6/1987 | ............. B41M 5/42 |
| JP | 2001011676 A | * | 1/2001 | |
| JP | 2001514285 A | * | 9/2001 | |
| JP | 2006063140 A | * | 3/2006 | ............. C08K 5/04 |
| WO | WO-2007007422 A1 | * | 1/2007 | ............. C08K 5/04 |

OTHER PUBLICATIONS

JP-62121093-A machine translation (Year: 1987).*
JP-2001011676-A machine translation (Year: 2001).*
JP-2006063140-A machine translation (Year: 2006).*
WO-2007007422-A1 machine translation (Year: 2007).*
JP2001514285A Machine Translation (Year: 2001).*

* cited by examiner

*Primary Examiner* — Terressa Boykin
(74) *Attorney, Agent, or Firm* — Womble Bond Dickinson (US) LLP; Jessica Gorczynski (57) ABSTRACT

The present disclosure provides poly(tetrafluoroethylene) (PTFE) microparticles with a Dv50 of about 20 μm to about 30 μm and a specific surface area (SSA) of at least about 3.0 m²/g when measured by a multipoint BET method of ISO 9277. Such PTFE microparticles can be obtained via a method including thermomechanically degrading scrap PTFE in the presence of air and/or oxygen and reducing the particle size of the resultant degraded PTFE.

23 Claims, 3 Drawing Sheets

MICROPARTICLES FROM THERMOMECHANICALLY DEGRADED PTFE

CROSS-REFERENCE TO RELATED APPLICATION

The present application is a continuation of U.S. patent application Ser. No. 17/329,346, filed May 25, 2021; which application claims priority to U.S. Provisional Patent Application No. 63/029,851, filed May 26, 2021 and U.S. Provisional Patent Application No. 63/030,634, filed May 27, 2020, which are incorporated by reference in their entireties.

FIELD OF THE INVENTION

The present application relates generally to the field of poly(tetrafluoroethylene) (PTFE) particles, and to methods of producing such particles.

BACKGROUND

Poly(tetrafluoroethylene) (PTFE) resin is used in paste extrusion processes to manufacture such products as sheets, profiles, monofilaments, and tubes. Paste extrusion of PTFE generally involves several steps, including: (1) paste preparation or resin mixing with lubricants; (2) preforming; (3) paste extrusion through one or more die heads; and (4) devolatilization. Paste extrusion processes produce scrap PTFE that is either unsintered or sintered. Unsintered scrap includes the end section of a preform (the "tail") as well as the conical remnant in the die head (the "cone"). Sintered scrap PTFE has gone through the entire process referenced above and includes trim scrap, changeover scrap, and off-spec material from start-up and shut down.

It is desirable to provide ways to utilize such scrap PTFE to manufacture new products and reduce waste. In particular, converting the scrap to PTFE microparticles represents one method by which value-added products can be produced, as such microparticles can be useful, e.g., in the fields of lubrication, polymer processing and printing/coating. Current methods of preparing scrap PTFE for grinding/microparticle production involve irradiation with high energy sources such as gamma, e-beam or X-ray to first embrittle the material. Various methods involve cutting, cleaning, drying, sintering, and ball-milling cryogenically; using ultraviolet radiation in combination with ozone and hydrogen peroxide; using ultraviolet radiation in combination with hydrogen peroxide and carbon tetrachloride, and thermally destructing PTFE waste in a reactor.

Although these methods may provide for a reduction of particle size, they produce particles that have low specific surface areas compared to microparticles obtained from virgin PTFE. It would be advantageous to provide further methods for the conversion of scrap PTFE to usable material such as microparticles.

SUMMARY

The disclosure provides microparticles obtained from PTFE feedstock, e.g., scrap PTFE. Such microparticles can exhibit significant specific surface area (e.g., hither for a given particle size than known PTFE microparticles prepared from scrap PTFE). The disclosure further provides methods of obtaining such PTFE microparticles, as well as methods of using such PTFE microparticles.

The present disclosure includes, without limitation, the following embodiments.

Embodiment 1: Microparticles comprising poly(tetrafluoroethylene) (PTFE), wherein the microparticles exhibit a Dv50 of about 20 μm to about 30 μm and a specific surface area (SSA) of at least about 3.0 $m^2/g$ when measured by a multipoint BET method of ISO 9277; and wherein the microparticles are prepared via thermomechanically degrading scrap PTFE in the presence of air and/or oxygen and reducing particle size of the degraded PTFE.

Embodiment 2: The microparticles of Embodiment 1, wherein the microparticles consist essentially of the poly(tetrafluoroethylene) and modified poly(tetrafluoroethylene) species.

Embodiment 3: The microparticles of Embodiment 2, wherein the modified poly(tetrafluoroethylene) species comprise poly(tetrafluoroethylene) modified by one or more of oxygen atoms, additional carbon atoms, and/or additional hydrogen atoms.

Embodiment 4: The microparticles of any of Embodiments 1-3, wherein the PTFE microparticles are prepared via a method that does not comprise irradiation.

Embodiment 5: The microparticles of any of Embodiments 1-4, wherein the thermomechanical degrading comprises passing the PTFE multiple times through equipment designed for thermomechanical degradation.

Embodiment 6: The microparticles of any of Embodiments 1-5, wherein the reducing particle size comprises passing the degraded PTFE multiple times through equipment designed for particle size reduction.

Embodiment 7: The microparticles of any of Embodiments 1-6, wherein the thermomechanical degrading is conducted in an extruder.

Embodiment 8: The microparticles of any of Embodiments 1-7, wherein the thermomechanical degrading is conducted in an internal mixer.

Embodiment 9: The microparticles of any of Embodiments 1-8, wherein the scrap PTFE is in sintered form.

Embodiment 10: The microparticles of any of Embodiments 1-8, wherein the scrap PTFE is in unsintered form.

Embodiment 11: A product selected from the group consisting of lubricants and pigments, comprising the microparticles of any of Embodiments 1-10.

Embodiment 12: A method for providing microparticles comprising PTFE, comprising: providing scrap PTFE; degrading the scrap PTFE thermally and mechanically in the presence of air and/or oxygen to give degraded PTFE; and reducing the particle size of the degraded PTFE by grinding or milling.

Embodiment 13: The method of Embodiment 12, wherein the microparticles form a line on a plot of SSA versus Dv50 with a slope of at least around −0.05 $m^2/g \cdot \mu m$ and a y-intercept of at least around 4.0 $m^2/g$.

Embodiment 14: The method of any of Embodiments 12-13, wherein the method does not comprise irradiation.

Embodiment 15: The method of any of Embodiments 12-14, wherein the scrap PTFE is in sintered form.

Embodiment 16: The method of any of Embodiments 12-14, wherein the scrap PTFE is in unsintered form.

Embodiment 17: The method of any of Embodiments 12-16, wherein the degrading is conducted in an extruder or in an internal mixer Embodiment 18: The method of any of Embodiments 12-16, wherein the degrading is conducted in an environment comprising an oxygen:nitrogen ratio of about 0.4 or greater.

Embodiment 19: The method of any of Embodiments 12-18, further comprising repeating the degrading step two or more times.

Embodiment 20: The method of any of Embodiments 12-19, further comprising repeating the reducing step two or more times.

Embodiment 21: The method of any of Embodiments 12-20, further comprising separating the micropowder obtained after the reducing step into fractions according to particle size.

Embodiment 22: The method of any of Embodiments 12-21, wherein the separating comprises sieving or processing with an air classifier to give the microparticles.

Embodiment 23: Microparticles obtained by the process of any of Embodiments 12-22.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present disclosure provides PTFE particles, e.g., microparticles. PTFE microparticles as provided herein are characterized, at least in part, by a relatively high surface area as compared with PTFE microparticles obtained from irradiation of sintered PTFE. Methods for providing such PTFE microparticles, as well as methods of using such PTFE microparticles and products including such PTFE microparticles are also provided herein.

Figure 1:
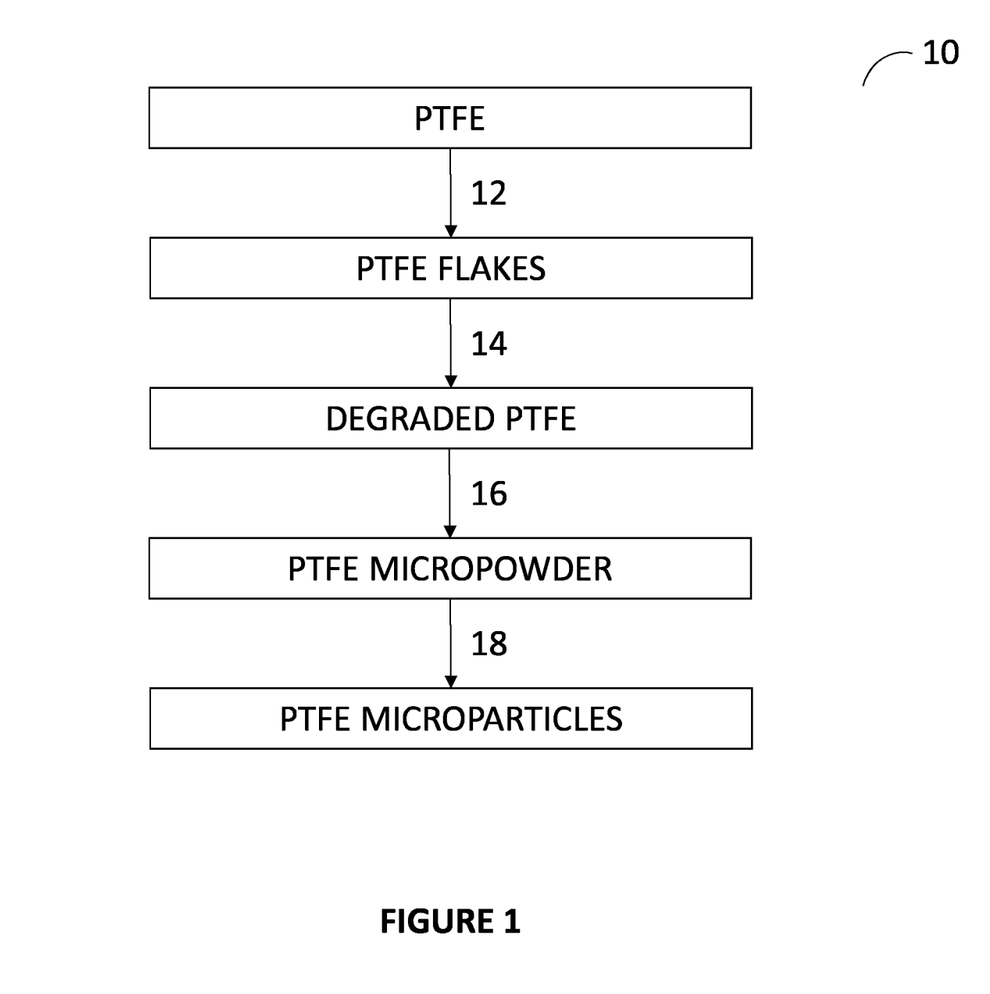
FIG. 1 is a general schematic of a process according to certain embodiments of the present disclosure.

A general schematic of one embodiment of a method of providing PTFE microparticles is shown in FIG. 1. As shown therein, method 10 starts with PTFE, provides PTFE flakes via granulating step 12, degrades the PTFE flakes via degradation step 14 to give a degraded PTFE, reduces the size of the PTFE into a micropowder via step 16, and finally processes the micropowder further via step 18 to give PTFE microparticles. In some embodiments, the method provided herein can be described as not comprising irradiation (e.g., ultraviolet radiation). In some embodiments, the method can be described as not comprising cryogenic processes. In some embodiments, the method can be described as not comprising thermal destruction in a reactor. In some embodiments, the method can be described as not comprising use of ozone, hydrogen peroxide, or carbon tetrachloride. Relevant features and parameters of each of the steps of the disclosed method 10 are outlined herein below.

The starting material ("PTFE") of method 10 can be derived from various sources. In some embodiments, the PTFE is "scrap" PTFE from a paste extrusion process. As referenced above, a paste extrusion process generally comprises mixing a PTFE resin with one or more lubricants, preforming the resulting paste, extruding the resulting paste through one or more dies; the resulting shaped material is then devolatilized and sintered. Fine powder PTFE resins that are suitable for paste extrusion processes can be extruded, e.g., at a reduction ratio exceeding 300. Exemplary resins suitable for this purpose include, but are not limited to, Daikin F205, F201, F201L, F208, and F207 resins, Dyncon TF 2071, TF 2072, and TF 2053 resins, Chemours Teflon 640XT X, 641XT X, CFP 6000 X, 62XT X, 6C X, and 6CN X and Asahi Glass CD 090E, and CD 097E. It is to be understood that the products and methods described herein are not limited to such resins, and any PTFE resins can be reasonably used within the scope of the present disclosure. Although the disclosure refers herein, e.g., to "PTFE" resins, "PTFE" scrap, "PTFE" flakes, degraded "PTFE," extruded "PTFE," and "PTFE" micropowders and microparticles (or micropowders and microparticles "containing PTFE"), it is noted that these materials may not comprise 100% PTFE, but are nonetheless encompassed by the present disclosure. For example, PTFE resins commonly used in paste extrusion can be homopolymeric or non-homopolymeric (e.g., as modified resins with a small amount of comonomer are commonly employed due to lower transition temperature). All scrap material from extrusion of these homopolymeric and non-homopolymeric "PTFE resins" are suitable for use according to the present disclosure and thus, all reference to "PTFE" is intended to encompass these materials.

Scrap remaining from the paste extrusion process, as noted above, can be classified, e.g., as unsintered (e.g., tail or cone remnant material) or sintered (e.g., trim scrap, changeover scrap, and off-spec material from start-up and shut-down processes). The presently disclosed process can employ either sintered or unsintered scrap material.

Step 12 comprises processing the PTFE to provide it in "flake" form. Such processing can, in some embodiments, comprise granulating the PTFE. Various methods and equipment for granulating are known and can be suitably used in the method provided herein. For example, a granulator (e.g., an MPG granulator) or a grinding mill (e.g., a Wiley mill) can be used to provide flaked PTFE. In some embodiments, screens of different opening sizes can be used with such instruments, depending on the size of the flake desired (e.g., an 8 mm screen or a 6 mm screen). Advantageously, a flake size of less than about 8 mm or less than about 6 mm, e.g., about 4 mm to about 6 mm is targeted at this step. It is noted that the term "flake" is used herein to describe the form of the PTFE at this stage; however, the shape is not limited to a flake-like shape and can be, e.g., substantially spherical, substantially cube-like, have an irregular particle shape, or exhibit another shape. In some embodiments, the flaked PTFE comprises PTFE of substantially the same size/shape; in other embodiments, the size and/or shape of individual PTFE "flakes" can vary within a given sample.

The flaked PTFE is subjected to degradation step 14. Advantageously, degradation step 14 comprises thermomechanical degradation, which is degradation due to mechanically induced thermal processes. Thermomechanical degradation typically comprises subjecting the flaked PTFE to heat and pressure (which can be provided, e.g., via extrusion and/or mechanical mixing). Thermomechanical degradation results in degradation of at least a portion of the PTFE polymers within a given sample, e.g., by cleavage within the polymer, including, but not limited to, depolymerization, random chain scission, side group elimination, oxidation, and combinations thereof. Thermomechanical degradation in the context of the present disclosure intended to mean degradation of PTFE polymers, induced by heat, shear, and/or oxygen. In some embodiments, degradation results in the modification of at least a portion of the PTFE polymers in a given sample, e.g., via the introduction of oxygen atoms to the polymer structure and/or the introduction of additional carbon and/or hydrogen atoms.

Thermomechanical degradation can be conducted, for example, in an extruder and/or in a mixer (e.g., an internal mixer or a continuous mixer). Suitable internal mixers include, but are not limited to, Farrel Corporation's Banbury F620 or BM lines of mixers or Kobelco's Mixtron BB Tangential or Mixtron BB Intermeshing lines of mixers. Suitable continuous mixers include, but are not limited to, the FCM and LCM lines of continuous mixers manufactured by Farrel Pomini. Extruder design such as barrel size, extruder size and design, and operating conditions such as barrel zone temperatures, screw speed, and throughput can be adjusted along with the ratio of oxygen to nitrogen. In some embodiments, such parameters are manipulated to influence the rate and extent of polymer degradation.

The mean barrel zone temperature within an extruder used for thermomechanical degradation according to the present disclosure is not particularly limited and is generally in a range sufficient to ensure the flaked PTFE becomes sufficiently molten to allow for movement within the barrel and subsequent extrusion through a die. Suitable temperatures include, e.g., temperatures of about 200° C. to about 400° ° C. in the barrel and temperatures of about 400° C. to about 600° C. in the die.

The physical and operational features of the screw within an extruder used for thermomechanical degradation according to the present disclosure are similarly not particularly limited. For example, the screw size (e.g., L/D ratio) and design (e.g., geometry) can vary. A wide range of screw diameters, lengths, and designs can be employed. Classic, single-screw extruders can be used, as well as twin screw extruders (co-rotating and counter-rotating). The screw design simply, in some embodiments, may help to ensure appropriate melting and homogenization of the resin being processed before delivering it to the extrusion die. The extruder screw speed and throughput, as well as air flow speed and pressure within an extruder can, in some embodiments, also be adjusted. The die size and shape can be selected from any die sizes and shapes; the target size and shape of the resulting extrudate is not particularly limited (as it will be further processed to provide the desired particles). The die temperature is generally higher than that of the barrel, but again is not particularly limited (e.g., about 400° ° C. to about 600° C.). One of skill in the art will recognize the considerations associated with selecting the appropriate parameters for extrusion based, e.g., on the rheology of the polymeric resin, to ensure a suitable extrudate is produced.

In some embodiments, the thermomechanical degradation is conducted at least partially within an atmosphere comprising air; in some embodiments, the thermomechanical degradation is conducted within an atmosphere comprising oxygen (and can, in some embodiments, include both air and oxygen). In some embodiments, the atmosphere further comprises nitrogen. The ratio of oxygen to nitrogen can be varied. In some embodiments wherein the degradation is conducted with in an extruder, an oxygen/nitrogen mixture can be injected into a downstream extruder port under pressure to aid in polymer degradation. The ratio of oxygen to nitrogen (volume/volume) advantageously used according to embodiments of the disclosure can range from about 0.27 (average ratio in air) up to about 90. In certain embodiments, the atmosphere at which the thermomechanical degradation is conducted comprises oxygen and nitrogen in a volume ratio of about 0.5 to about 4. It may be advantageous in some embodiments to conduct the degradation in an oxygen/nitrogen mixture with higher oxygen content than air, e.g., in an environment with an oxygen to nitrogen volume ratio greater than 0.27, e.g., greater than about 0.3, greater than about 0.4, or greater than about 0.5.

Following thermomechanical degradation via extrusion, the extrudate is cooled and various methods are known. For example, the extrudate can be passively cooled for a specified time, e.g., with air; it can be cooled via a water bath at a set temperature; or can be cooled through the action of a blower or fan. Similarly, where thermomechanical degradation is conducted via a mixer or other apparatus, the degraded material will typically be at elevated temperature and will require cooling, which can be conducted in a similar manner.

It is to be understood that, following the thermomechanical degradation, the PTFE will be different in composition than prior to this step. Specifically, the molecular weight of polymer chains within the material will be decreased (due, e.g., to chain scission); and other species may be formed within the material. In this context, reference to "degraded PTFE" and subsequent "PTFE micropowder" and "PTFE microparticles" is intended to encompass all species present within the material upon degradation (including, in some embodiments, modified polymeric species produced within the sample via the thermomechanical degradation process).

The degraded PTFE (e.g., in extrudate form) is next reduced in size to a "micropowder" via step 16. "Micropowder" is intended to refer to a granular material, which can be substantially homogeneous in size or substantially inhomogeneous in size. The size reduction in this step can be conducted, e.g., within the same equipment as described above with respect to granulating step 12. In addition, hammer mills and jet mills (including cryogenic mills) can suitably be used in some embodiments. Target mean or maximum particle sizes for step 16 can, in some embodiments, be about 2 mm to about 8 mm, e.g., about 2 to about 6 mm, about 2 to about 4 mm, or about 4 to about 6 mm. Again, the individual particles of the micropowder provided in step 16 can be substantially uniform in size/shape or can vary within a given sample. Typically, the micropowder obtained during this step exhibits a somewhat broad size distribution.

The micropowder is then further processed via step 18 to give PTFE microparticles. This step generally involves classification/sieving. The classification/sieving is designed to provide micropowder in narrow size distribution, i.e., "microparticles." The target values of mean or maximum particle sizes for the microparticles provided via process 10 are not particularly limited; various such particle sizes can be targeted, depending upon the desired application of the resulting microparticles. Suitable types of equipment to provide individual fractions of PTFE microparticles with relatively narrow size distribution include, but are not limited to, air classifiers and mechanical sieves.

In some embodiments, process 10 provides suitable particles with desired mean particle sizes and desired particle size distributions. In some embodiments, the process can further comprise reprocessing one or more of the materials produced through one or more of the steps of process 10. For example, in some embodiments, smaller microparticles can be provided, e.g., by reprocessing the PTFE flakes or a degraded PTFE extrudate multiple times through one or more of the described steps. For example, step 14 can, in some embodiments, be conducted multiple times by obtaining an extrudate, regrinding that extrudate, and again submitting that re-ground extrudate to thermomechanical degradation via extrusion. As such, the thermomechanical degradation step can be conducted once to provide the desired microparticles or can be conducted twice, three times, or even more as desired throughout the process, e.g., to obtain smaller microparticles.

The size of the microparticles targeted and obtained via step 14 can vary depending, e.g., on the application for which the microparticles may be used (with examples of such applications described further below). In some embodiments, the size of the microparticles is described by the Dv50 of a sample, i.e., representing the median size of the volume distribution. The Dv50 of certain microparticles provided herein can be, e.g., above about 20 µm, such as about 20 to about 80 µm, e.g., about 20 µm to about 40 µm, or about 20 to about 30 µm. Particle size distribution is commonly evaluated based on percentage by volume.

The PTFE microparticles provided via the methods disclosed herein and, in particular, obtained by thermomechanical degradation of PTFE as described above, differ in several important aspects from microparticles of the same size and distribution obtained through the polymerization of tetrafluoroethylene to manufacture PTFE. Thermomechanical degradation, as referenced above, lowers the molecular weight of the PTFE polymer used to manufacture the microparticles through chain scission. Moreover, the degradation reactions in some embodiments of the disclosed method will add one or more of oxygen, hydrogen and carbon to the polymer chains of the PTFE microparticles provided herein. See. e.g., J. A. Conesa, R. Font, "Polytetrafluoroethylene Decomposition in Air and Nitrogen", Polymer Eng. & Sci., 41, 2137, 2001, which is incorporated herein by reference in its entirety.

Advantageously, the microparticles provided herein can be characterized by characteristics such as particle size distributions, specific surface area and shape parameters such as: circularity, equivalent circular area, smoothness, equivalent elliptical length/width/area, ellipticity, rectangularity, polygon order, interior angles, convexity, fiber width/length, Feret width/length, aspect ratios, surface uniformity, opacity, color and white fraction that render them suitable for a range of applications. In some embodiments, the equivalent circular area can have a mean diameter of 25.1 µm and a standard deviation of 14.7 µm. In some embodiments, the circularity can have a mean value of 0.535 and a standard deviation of 0.193. In some embodiments, the smoothness can have a mean value of 0.602 and a standard deviation of 0.138 µm. In some embodiments, the equivalent elliptical area width can have a mean value of 28.1 µm and the equivalent elliptical area length can have a mean value of 40.8. In some embodiments, the ellipticity can have a mean value of 0.675 and a standard deviation of 0.141. In some embodiments, the rectangularity can have a mean value of 0.679 and a standard deviation of 0.113. In some embodiments, the polygon order can have a mean value of 6.1 and a standard deviation of 1.1. In some embodiments, the convexity can have a mean value of 0.984 and a standard deviation of 0.061. In some embodiments, the polygon interior angles can have a mean value of 115 and a standard deviation of 35. In some embodiments, the fiber width can have a mean value of 21.8 µm, the fiber length can have a mean value of 49.7, and the fiber aspect ratio can have a mean value of 2.6. In some embodiments, the Feret width can have a mean value of 30.3 µm, the Feret length can have a mean value of 43.5, and the Feret aspect ratio can have a mean value of 2.5. In some embodiments, the surface uniformity can have a mean value of 0.702 with a standard deviation of 0.170. In some embodiments, the opacity can have a mean value of 0.481 with a standard deviation of 0.047. In some embodiments, the white fraction can have a mean value of 0.069 with a standard deviation of 0.063.

The PTFE microparticles resulting from the disclosed process uniquely exhibit higher specific surface area (SSA) per unit mass than comparative microparticles prepared from scrap PTFE via known methods (which involve irradiation of the PTFE). It is believed that the comparative irradiation based-methods use high energy input (e.g., on the order of 1 KJ/g or greater), which adversely impacts the surface properties of the PTFE. As a result, comparative particles formed during subsequent grinding operations have low specific surface areas for a given mean particle diameter. For example, Daikin 1-5F virgin PTFE microparticles have a mean diameter of 4.0 µm and a specific surface area (SSA) of 11 $m^2/g$. GT105 manufactured by Shamrock, which is obtained from irradiation/grinding sintered PTFE, has a similar mean diameter of around 3.5 µm but a SSA of only 2.7 $m^2/g$. Hence for similar loadings, less interfacial area would be generated with the GT 105 compared to the I-5F. The microparticles of the present disclosure can have particle size distributions similar to particles obtained from high energy irradiation processes, while possessing higher SSA.

In some embodiments, the disclosed PTFE microparticles exhibit SSA values that are about 3.0 $m^2/g$ or higher when the Dv50 of the powder is between about 20 µm and about 30 µm. In some embodiments, the disclosed PTFE microparticles exhibit SSA values that are about 3.0 $m^2/g$ or higher when the Dv50 of the powder is between about 20 µm and about 24 µm, between about 20 µm and about 25 µm, between about 20 µm and about 26 µm, between about 20 µm and about 27 µm, between about 20 µm and about 28 µm, or between about 20 µm and about 29 µm. Such SSA values can be measured, e.g., via the multipoint BET method of ISO 9277. In some embodiments, when the SSA versus Dv50 values are plotted against one another, the slope of the resultant line is at least around −0.05 $m^2/g·µm$ and the y-intercept is at least around 4.0 $m^2/g$.

The desirably high comparative SSA values of the disclosed PTFE microparticles renders them particularly suitable for various application. For example, for applications such as slip aids and lubricants, including greases and polymer processing aids, it is advantageous to use small particles having a high surface area. This higher SSA can be expected to improve lubricity in oils and greases and to promote enhanced slip at polymer-metal interfaces to delay the onset of melt instabilities during polymer processing operations. The small diameters of the particles minimize adverse effects to physical properties of the matrix resin, while the high SSA improves the functionality of the microparticles within the matrix. Moreover, SSA affects optimum packing density of a disperse phase within a continuous phase. As SSA increases, the packing density increases up to an optimal value of SSA, as described in I. Mehdipour, K. H. Khayat. "Effect of particle-size distribution and specific surface area of different binder systems on packing density and flow characteristics of cement paste", Cement and Concrete Composites, 78, 2017, 120-131, which is incorporated herein by reference. Hence having a high value of SSA can be favorable to formulations requiring high loadings of microparticles.

This feature of the disclosed microparticles is beneficial, e.g., in many applications requiring adsorption of a mobile phase onto the microparticle surface. Such microparticles could be useful in a wide variety of applications including additives for liquid, paste or cross-linkable printing inks; for liquid, powder or cross-linkable coatings; for polymer processing aids; for greases and lubricants and for personal care products such as cosmetics. The functionality of the micropowders to act as pigments, viscosity modifiers, slip promoters, lubricating agents, optical diffusers, chemical resistance enhancers, anti-wear additives, thermal performance enhancers, polymer melt surface stabilizers, as well as aesthetic modifiers for inks and coatings can also permit the inventive microparticles to be used in other applications as well.

Thus, the disclosure provides various products incorporating microparticles prepared from scrap PTFE exhibiting the disclosed SSA values. The disclosure further provides various products incorporating microparticles prepared from scrap PTFE via the methods described herein. Such products include, but are not limited to, inks/pigments (as well as aesthetic modifiers therefor), coatings, polymer processing aids, viscosity modifiers, slip promotors (slip aids), lubricating agents, greases, optical diffusers, chemical resistance enhancers, anti-wear additives, thermal performance enhancers, and polymer melt surface stabilizers. In some embodiments, such products are provided which comprise high loadings of PTFE microparticles, including such products which contain higher loadings of PTFE microparticles than obtainable when employing comparable PTFE microparticles produced via irradiation-based methods.

EXAMPLES

Aspects of the present invention are more fully illustrated by the following examples, which are set forth to illustrate certain aspects of the present invention and are not to be construed as limiting thereof.

Example 1

Scrap PTFE resin from a tube extrusion process was recovered after sintering, chopped up and ground into flakes using a Wiley Mill with 6 mm screen. These flakes were fed into the hopper of a 63.5 mm single screw extruder having a mixing screw with L/D=20/1. Barrel temperatures in the sections from the feed throat to the spiral head were set at 232° C., 327° C. and 382° ° C. The head temperatures were set at 427° C. and 590° C. and the extrusion was done under an atmospheric oxygen:nitrogen ratio (0.27 oxygen:nitrogen). The extrudate was cooled in ambient air upon exiting the die head. Throughput rates were around 7 kg/h.

The extrudate exiting the head was easily friable after cooling to room temperature. The color was white. The extrudate was collected in a container and ground up in a Wiley Mill through a 4 mm screen.

The ground material was subsequently used as feedstock for a Hosokawa Micro 15 ACM-EA Air-Classifying Mill for further size reduction. The operating conditions are summarized below.

Hopper gap: 4 mm
Rotor Speed: 7000 RPM
Classifier Speed: 2000 RPM
Air Flow: 600 CFM
Jet Pressure: 4 Bar Particle Size Distributions (PSDs) were obtained using a Mastersizer 3000 Particle Size Analyzer from Malvern Panalytical. Specific Surface Area was measured using the BET Method of ISO 9277 with a TriStar II Plus Surface Area Analyzer from Micromeretics.

Figure 2:
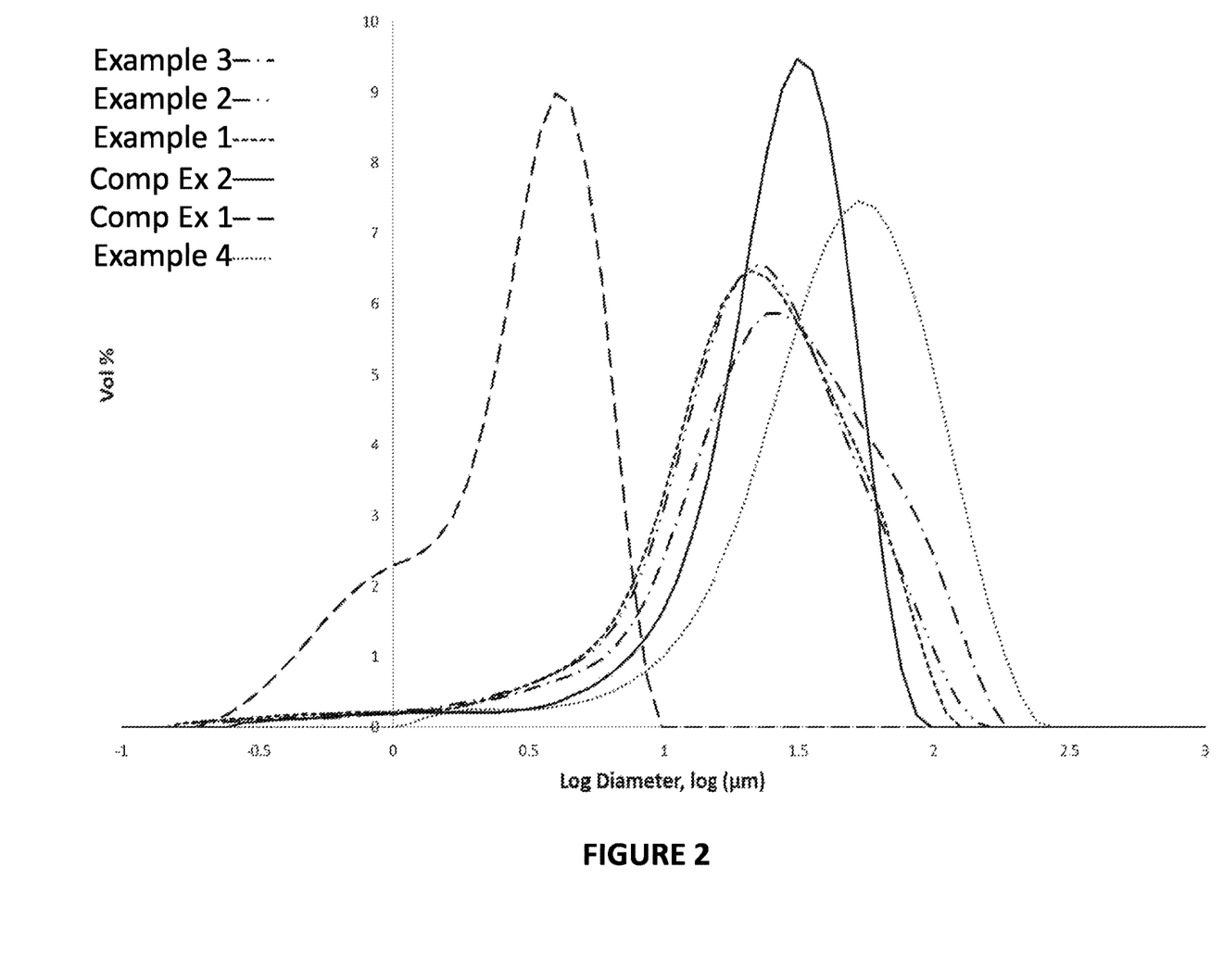
FIG. 2 is a plot of particle size distributions for various microparticles from sintered PTFE.

The properties of the resulting microparticles are summarized in Table 1, below. Dv50 represents the median size of the volume distribution. The particle size distribution is shown in FIG. 2 based on percentage by volume.

Example 2

The material of Example 1 was used as feedstock for a Hosokawa Micro 15 Standard ACM under the same operating conditions. The properties of the resulting microparticles are also summarized in Table 1 and the particle size distribution is shown in FIG. 2.

Example 3

The extrudate from Example 1 was collected in a container and ground up in a Wiley Mill through a 6 mm screen. This material was used as feedstock for a Hosokawa Micro 15 Standard ACM. The classifier speed used in this instance was 3000 RPM. The properties of the resulting microparticles are also summarized in Table 1 and the particle size distribution is shown in FIG. 2.

Example 4

The thermomechanical degradation procedure described in Example 1 was used with a blend of 40% oxygen and 60% nitrogen (v/v) gas introduced into the feed throat of the extruder at 10 L/min along with the scrap PTFE flakes. The extrusion conditions were essentially similar to those described in Example 1. The extrudate, however, was noted to be much more friable than the extrudate of Example 1. The color of the extrudate was noted to be a brighter white than that produced in Example 1.

The objective of this example was to obtain an extrudate that was more highly degraded (i.e., more friable) and therefore more amenable to grinding and classification in standard equipment (a small particle size was not the target for this example, as there are applications for larger particle size as well). It is not believed that the difference in gas makeup within the extruder precludes the possibility of preparing particles of smaller particle size. This material was used as feedstock for a hammermill and jet mill (Jet Pulverizer Company) for size reduction. The output was sieved with a 150 µm Standard Test Sieve where 43% (w/w) of the output material passed through the openings. The sub-150 µm fraction was analyzed in the manner described in Example 1. The properties of the resulting microparticles are summarized in Table 1 and the particle size distribution is shown in FIG. 2. Although not intending to be limited by theory, it is believed that the lower oxygen/nitrogen ratio in which the degradation was conducted in this Example led to a product outside the desired specifications (i.e., larger particle size, lower SSA) as compared with the products prepared via degradation at higher oxygen/nitrogen ratios.

Comparative Example 1

GT105 is a grade of PTFE microparticles from Shamrock Technologies that is obtained from the irradiation of sintered PTFE scrap material (Shamrock GT 105 TDS issued 1 Jun. 2016). These comparative microparticles were analyzed by the methods described in Example 1. The properties of the comparative microparticles are summarized in Table 1 and the particle size distribution is shown in FIG. 2.

Comparative Example 2

GT130 is a grade of PTFE microparticles from Shamrock Technologies that is obtained from the irradiation of sintered PTFE scrap material (Shamrock GT 130 TDS issued 1 Jun. 2016). These comparative microparticles were analyzed by the methods described in Example 1. The properties of the comparative microparticles are summarized in Table 1 and the particle size distribution is shown in FIG. 2.

TABLE 1

Properties of PTFE Microparticles

| | Example 1 | Example 2 | Example 3 | Example 4 | Comparative Example 1 | Comparative Example 2 |
|---|---|---|---|---|---|---|
| Dv50, µm | 22.9 | 23.5 | 28.8 | 60.7 | 3.4 | 29.6 |
| SSA, m$^2$/g | 3.029 | 3.067 | 2.901 | 1.103 | 2.774 | 0.954 |

The data of Table 1 demonstrate that the SSA of microparticles obtained from the thermomechanical degradation of PTFE scrap according to the methods provided herein is significantly and surprisingly greater than the SSA of microparticles obtained from irradiation of PTFE scrap at similar values of Dv50. Note, for instance, the great difference in SSA between Example 3 and Comparative Example 2.

Table 2 summarizes some grades of micronized PTFE obtained from sintered polymer that are currently commercially available. None of the tabulated grades have a reported SSA above 3.0.

TABLE 2

Micronized PTFE Grades from Sintered Scrap PTFE

| Manufacturer | Grade | Size | SSA |
|---|---|---|---|
| FluoroChemie | TPD-505H | ≈5.5 µm | ≈2.0 m$^2$/g |
| | TPD-515H | ≈15 µm | ≈2.0 m$^2$/g |
| Shamrock | Fluoro GT 105 | 3.4 µm | 2.8 m$^2$/g |
| | Fluoro GT 130 | 30 µm | 1.0 m$^2$/g |

TABLE 2-continued

Micronized PTFE Grades from Sintered Scrap PTFE

| Manufacturer | Grade | Size | SSA |
|---|---|---|---|
| | MicroFLON T-801 | 35-55 µm | 1.0-3.0 m$^2$/g |
| | MicroFLON T-803HT | 20-25 µm | 1.0-3.0 m$^2$/g |
| | MicroFLON T-807 | 10-12 µm | 1.0-3.0 m$^2$/g |

Figure 3:
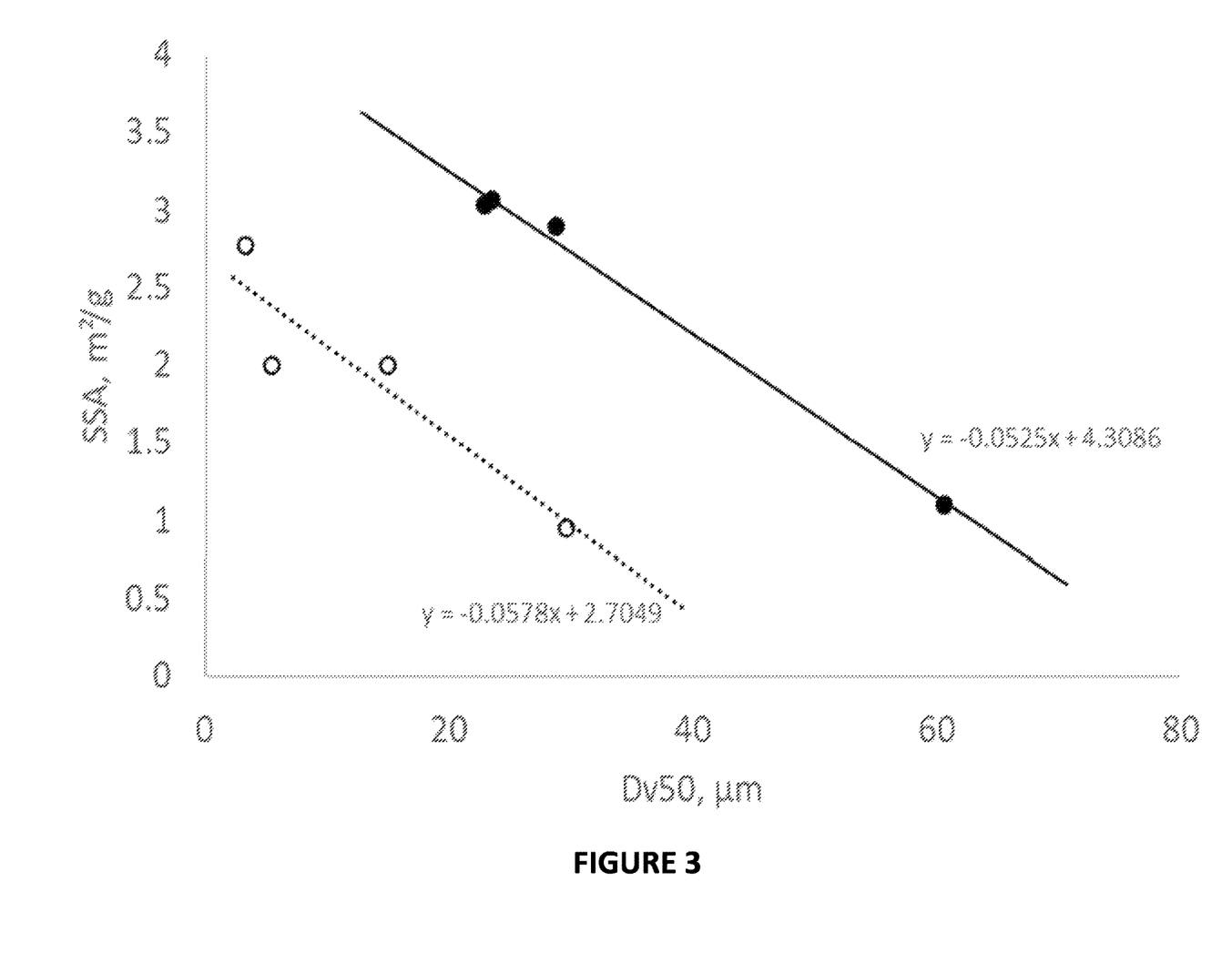
FIG. 3 is a plot of specific Surface Area of sintered PTFE micropowders versus Dv50. Filled circles represent the inventive micropowders, where open circles represent grades known in the art from Table 2 and the equations shown are lines of best fit for the respective groups of micropowders.

The microparticles from Table 2 that specify discrete values of size and SSA rather than ranges of values are combined with microparticles from Comparative Example 1 and Comparative Example 2 and plotted on a graph of SSA versus Dv50 along with the microparticles provided according to the presently disclosed methods in FIG. 3.

FIG. 3 shows that the SSAs of the micropowders provided according to the present disclosure lie on a line that is shifted to the right of the line expected from comparative microparticles known to the art obtained from irradiating sintered PTFE. The observed shift signifies that the microparticles prepared according to the methods outlined herein have a higher SSA for any given value of Dv50.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. Microparticles comprising reprocessed poly(tetrafluoroethylene) (PTFE),
   wherein the microparticles exhibit a Dv50 of about 20 µm to about 30 µm and an improved specific surface area (SSA) for particles of that size range of at least about 3.0 m$^2$/g when measured by a multipoint BET method of ISO 9277.

2. The microparticles of claim 1, wherein the microparticles are prepared via thermomechanically degrading reprocessed PTFE in the presence of air and/or oxygen to give degraded PTFE and reducing particle size of the degraded PTFE.

3. The microparticles of claim 1, wherein the microparticles consist essentially of the reprocessed poly(tetrafluoroethylene) and modified poly(tetrafluoroethylene) species.

4. The microparticles of claim 3, wherein the modified poly(tetrafluoroethylene) species comprise poly(tetrafluoroethylene) modified by one or more of oxygen atoms, additional carbon atoms, and/or additional hydrogen atoms.

5. The microparticles of claim 1, wherein the microparticles are prepared via a method that does not comprise irradiation.

6. The microparticles of claim 2, wherein the thermomechanical degrading comprises passing the reprocessed PTFE multiple times through equipment designed for thermomechanical degradation.

7. The microparticles of claim 2, wherein the reducing particle size comprises passing the degraded PTFE multiple times through equipment designed for particle size reduction.

8. The microparticles of claim 2, wherein the thermomechanical degrading is conducted in an extruder.

9. The microparticles of claim 2, wherein the thermomechanical degrading is conducted in an internal mixer.

10. The microparticles of claim 1, wherein the reprocessed PTFE is in sintered form.

11. The microparticles of claim 1, wherein the reprocessed PTFE is in unsintered form.

12. A product selected from the group consisting of lubricants and pigments, comprising the microparticles of claim 1.

13. A method for providing microparticles comprising PTFE, comprising:
providing reprocessed PTFE;
degrading the reprocessed PTFE thermally and mechanically in the presence of air and/or oxygen to give degraded PTFE; and
reducing the particle size of the degraded PTFE by grinding or milling to give the microparticles,
wherein the microparticles exhibit a Dv50 of about 20 µm to about 30 µm and an improved specific surface area (SSA) for particles of that size range of at least about 3.0 m$^2$/g when measured by a multipoint BET method of ISO 9277, and
wherein the method does not comprise irradiation.

14. The method of claim 13, wherein the microparticles form a line on a plot of SSA versus Dv50 with a slope of at least around −0.05 m$^2$/g·µm and a y-intercept of at least around 4.0 m$^2$/g.

15. The method of claim 13, wherein the reprocessed PTFE is in sintered form.

16. The method of claim 13, wherein the reprocessed PTFE is in unsintered form.

17. The method of claim 13, wherein the degrading is conducted in an extruder or an internal mixer.

18. The method of claim 13, wherein the degrading is conducted in an environment comprising an oxygen:nitrogen ratio of about 0.4 or greater.

19. The method of claim 13, further comprising repeating the degrading step two or more times.

20. The method of claim 13, further comprising repeating the reducing step two or more times.

21. The method of claim 13, further comprising separating a micropowder obtained after the reducing step into fractions according to particle size.

22. The method of claim 21, wherein the separating comprises sieving or processing with an air classifier to give the microparticles.

23. Microparticles obtained by the process of claim 13.

* * * * *